(12) United States Patent
Tully et al.

(10) Patent No.: US 11,556,640 B1
(45) Date of Patent: Jan. 17, 2023

(54) SYSTEMS AND METHODS FOR AUTOMATED CYBERSECURITY ANALYSIS OF EXTRACTED BINARY STRING SETS

(71) Applicant: FireEye, Inc., Milpitas, CA (US)

(72) Inventors: Philip Tully, New York, NY (US);
Matthew Haigh, New York, NY (US);
Jay Gibble, Leesburg, VA (US);
Michael Sikorski, New York, NY (US)

(73) Assignee: Mandiant, Inc., Milpitas, CA (US)

( * ) Notice: Subject to any disclaimer, the term of this patent is extended or adjusted under 35 U.S.C. 154(b) by 808 days.

(21) Appl. No.: 16/455,624

(22) Filed: Jun. 27, 2019

(51) Int. Cl.
*G06F 21/56* (2013.01)
*G06N 20/00* (2019.01)
*H04L 9/40* (2022.01)

(52) U.S. Cl.
CPC .......... *G06F 21/562* (2013.01); *G06N 20/00* (2019.01); *H04L 63/145* (2013.01); *G06F 2221/033* (2013.01)

(58) Field of Classification Search
CPC .......... G06F 21/562; G06F 2221/033; G06N 20/22; H04L 63/145
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |

(Continued)

FOREIGN PATENT DOCUMENTS

| | | | |
|---|---|---|---|
| CN | 105760762 A | * 7/2016 | ............. G06F 21/56 |
| GB | 2439806 A | 1/2008 | |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Paul E Callahan
(74) *Attorney, Agent, or Firm* — Rutan & Tucker, LLP

(57) ABSTRACT

An automated system and method for analyzing a set of extracted strings from a binary is disclosed including processing the binary with a string-extraction logic that can locate strings within the binary and output an extracted string set for use in cybersecurity analysis. The logic retrieves a set of training data comprising a plurality of previously analyzed extracted string sets where each element of the previously analyzed extracted string set comprises at least one extracted string and a corresponding previously determined threat prediction score. A prediction model based upon the training data is generated and the extracted string set is processed by the prediction model to determine a threat prediction score for each string. Ranking of the located strings is based upon the determined threat prediction score, and an output of a ranked string list is generated.

25 Claims, 6 Drawing Sheets

(56) References Cited

U.S. PATENT DOCUMENTS

| | | |
|---|---|---|
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 3,006,305 A1 | 8/2011 | Aziz |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |

(56) References Cited

U.S. PATENT DOCUMENTS

| | | | |
|---|---|---|---|
| 8,533,824 | B2 | 9/2013 | Hutton et al. |
| 8,539,582 | B1 | 9/2013 | Aziz et al. |
| 8,549,638 | B2 | 10/2013 | Aziz |
| 8,555,391 | B1 | 10/2013 | Demir et al. |
| 8,561,177 | B1 | 10/2013 | Aziz et al. |
| 8,566,476 | B2 | 10/2013 | Shiffer et al. |
| 8,566,946 | B1 | 10/2013 | Aziz et al. |
| 8,584,094 | B2 | 11/2013 | Dadhia et al. |
| 8,584,234 | B1 | 11/2013 | Sobel et al. |
| 8,584,239 | B2 | 11/2013 | Aziz et al. |
| 8,595,834 | B2 | 11/2013 | Xie et al. |
| 8,627,476 | B1 | 1/2014 | Satish et al. |
| 8,635,696 | B1 | 1/2014 | Aziz |
| 8,682,054 | B2 | 3/2014 | Xue et al. |
| 8,682,812 | B1 | 3/2014 | Ranjan |
| 8,689,333 | B2 | 4/2014 | Aziz |
| 8,695,096 | B1 | 4/2014 | Zhang |
| 8,713,631 | B1 | 4/2014 | Pavlyushchik |
| 8,713,681 | B2 | 4/2014 | Silberman et al. |
| 8,726,392 | B1 | 5/2014 | McCorkendale et al. |
| 8,739,280 | B2 | 5/2014 | Chess et al. |
| 8,776,229 | B1 | 7/2014 | Aziz |
| 8,782,792 | B1 | 7/2014 | Bodke |
| 8,789,172 | B2 | 7/2014 | Stolfo et al. |
| 8,789,178 | B2 | 7/2014 | Kejriwal et al. |
| 8,793,278 | B2 | 7/2014 | Frazier et al. |
| 8,793,787 | B2 | 7/2014 | Ismael et al. |
| 8,805,947 | B1 | 8/2014 | Kuzkin et al. |
| 8,806,647 | B1 | 8/2014 | Daswani et al. |
| 8,832,829 | B2 | 9/2014 | Manni et al. |
| 8,850,570 | B1 | 9/2014 | Ramzan |
| 8,850,571 | B2 | 9/2014 | Staniford et al. |
| 8,881,234 | B2 | 11/2014 | Narasimhan et al. |
| 8,881,271 | B2 | 11/2014 | Butler, II |
| 8,881,282 | B1 | 11/2014 | Aziz et al. |
| 8,898,788 | B1 | 11/2014 | Aziz et al. |
| 8,935,779 | B2 | 1/2015 | Manni et al. |
| 8,949,257 | B2 | 2/2015 | Shiffer et al. |
| 8,984,638 | B1 | 3/2015 | Aziz et al. |
| 8,990,939 | B2 | 3/2015 | Staniford et al. |
| 8,990,944 | B1 | 3/2015 | Singh et al. |
| 8,997,219 | B2 | 3/2015 | Staniford et al. |
| 9,009,822 | B1 | 4/2015 | Ismael et al. |
| 9,009,823 | B1 | 4/2015 | Ismael et al. |
| 9,027,135 | B1 | 5/2015 | Aziz |
| 9,071,638 | B1 | 6/2015 | Aziz et al. |
| 9,104,867 | B1 | 8/2015 | Thioux et al. |
| 9,106,630 | B2 | 8/2015 | Frazier et al. |
| 9,106,694 | B2 | 8/2015 | Aziz et al. |
| 9,118,715 | B2 | 8/2015 | Staniford et al. |
| 9,159,035 | B1 | 10/2015 | Ismael et al. |
| 9,171,160 | B2 | 10/2015 | Vincent et al. |
| 9,176,843 | B1 | 11/2015 | Ismael et al. |
| 9,189,627 | B1 | 11/2015 | Islam |
| 9,195,829 | B1 | 11/2015 | Goradia et al. |
| 9,197,664 | B1 | 11/2015 | Aziz et al. |
| 9,223,972 | B1 | 12/2015 | Vincent et al. |
| 9,225,740 | B1 | 12/2015 | Ismael et al. |
| 9,241,010 | B1 | 1/2016 | Bennett et al. |
| 9,251,343 | B1 | 2/2016 | Vincent et al. |
| 9,262,635 | B2 | 2/2016 | Paithane et al. |
| 9,268,936 | B2 | 2/2016 | Butler |
| 9,275,229 | B2 | 3/2016 | LeMasters |
| 9,282,109 | B1 | 3/2016 | Aziz et al. |
| 9,292,686 | B2 | 3/2016 | Ismael et al. |
| 9,294,501 | B2 | 3/2016 | Mesdaq et al. |
| 9,300,686 | B2 | 3/2016 | Pidathala et al. |
| 9,306,960 | B1 | 4/2016 | Aziz |
| 9,306,974 | B1 | 4/2016 | Aziz et al. |
| 9,311,479 | B1 | 4/2016 | Manni et al. |
| 9,355,247 | B1 | 5/2016 | Thioux et al. |
| 9,356,944 | B1 | 5/2016 | Aziz |
| 9,363,280 | B1 | 6/2016 | Rivlin et al. |
| 9,367,681 | B1 | 6/2016 | Ismael et al. |
| 9,398,028 | B1 | 7/2016 | Karandikar et al. |
| 9,413,781 | B2 | 8/2016 | Cunningham et al. |
| 9,426,071 | B1 | 8/2016 | Caldejon et al. |
| 9,430,646 | B1 | 8/2016 | Mushtaq et al. |
| 9,432,389 | B1 | 8/2016 | Khalid et al. |
| 9,438,613 | B1 | 9/2016 | Paithane et al. |
| 9,438,622 | B1 | 9/2016 | Staniford et al. |
| 9,438,623 | B1 | 9/2016 | Thioux et al. |
| 9,459,901 | B2 | 10/2016 | Jung et al. |
| 9,467,460 | B1 | 10/2016 | Otvagin et al. |
| 9,483,644 | B1 | 11/2016 | Paithane et al. |
| 9,495,180 | B2 | 11/2016 | Ismael |
| 9,497,213 | B2 | 11/2016 | Thompson et al. |
| 9,507,935 | B2 | 11/2016 | Ismael et al. |
| 9,516,057 | B2 | 12/2016 | Aziz |
| 9,519,782 | B2 | 12/2016 | Aziz et al. |
| 9,536,091 | B2 | 1/2017 | Paithane et al. |
| 9,537,972 | B1 | 1/2017 | Edwards et al. |
| 9,560,059 | B1 | 1/2017 | Islam |
| 9,565,202 | B1 | 2/2017 | Kindlund et al. |
| 9,591,015 | B1 | 3/2017 | Amin et al. |
| 9,591,020 | B1 | 3/2017 | Aziz |
| 9,594,904 | B1 | 3/2017 | Jain et al. |
| 9,594,905 | B1 | 3/2017 | Ismael et al. |
| 9,594,912 | B1 | 3/2017 | Thioux et al. |
| 9,609,007 | B1 | 3/2017 | Rivlin et al. |
| 9,626,509 | B1 | 4/2017 | Khalid et al. |
| 9,628,498 | B1 | 4/2017 | Aziz et al. |
| 9,628,507 | B2 | 4/2017 | Haq et al. |
| 9,633,134 | B2 | 4/2017 | Ross |
| 9,635,039 | B1 | 4/2017 | Islam et al. |
| 9,641,546 | B1 | 5/2017 | Manni et al. |
| 9,654,485 | B1 | 5/2017 | Neumann |
| 9,661,009 | B1 | 5/2017 | Karandikar et al. |
| 9,661,018 | B1 | 5/2017 | Aziz |
| 9,674,298 | B1 | 6/2017 | Edwards et al. |
| 9,680,862 | B2 | 6/2017 | Ismael et al. |
| 9,690,606 | B1 | 6/2017 | Ha et al. |
| 9,690,933 | B1 | 6/2017 | Singh et al. |
| 9,690,935 | B2 | 6/2017 | Shiffer et al. |
| 9,690,936 | B1 | 6/2017 | Malik et al. |
| 9,736,179 | B2 | 8/2017 | Ismael |
| 9,740,857 | B2 | 8/2017 | Ismael et al. |
| 9,747,446 | B1 | 8/2017 | Pidathala et al. |
| 9,756,074 | B2 | 9/2017 | Aziz et al. |
| 9,773,112 | B1 | 9/2017 | Rathor et al. |
| 9,781,144 | B1 | 10/2017 | Otvagin et al. |
| 9,787,700 | B1 | 10/2017 | Amin et al. |
| 9,787,706 | B1 | 10/2017 | Otvagin et al. |
| 9,792,196 | B1 | 10/2017 | Ismael et al. |
| 9,824,209 | B1 | 11/2017 | Ismael et al. |
| 9,824,211 | B2 | 11/2017 | Wilson |
| 9,824,216 | B1 | 11/2017 | Khalid et al. |
| 9,825,976 | B1 | 11/2017 | Gomez et al. |
| 9,825,989 | B1 | 11/2017 | Mehra et al. |
| 9,838,408 | B1 | 12/2017 | Karandikar et al. |
| 9,838,411 | B1 | 12/2017 | Aziz |
| 9,838,416 | B1 | 12/2017 | Aziz |
| 9,838,417 | B1 | 12/2017 | Khalid et al. |
| 9,846,776 | B1 | 12/2017 | Paithane et al. |
| 9,876,701 | B1 | 1/2018 | Caldejon et al. |
| 9,888,016 | B1 | 2/2018 | Amin et al. |
| 9,888,019 | B1 | 2/2018 | Pidathala et al. |
| 9,910,988 | B1 | 3/2018 | Vincent et al. |
| 9,912,644 | B2 | 3/2018 | Cunningham |
| 9,912,681 | B1 | 3/2018 | Ismael et al. |
| 9,912,684 | B1 | 3/2018 | Aziz et al. |
| 9,912,691 | B2 | 3/2018 | Mesdaq et al. |
| 9,912,698 | B1 | 3/2018 | Thioux et al. |
| 9,916,440 | B1 | 3/2018 | Paithane et al. |
| 9,921,978 | B1 | 3/2018 | Chan et al. |
| 9,934,376 | B1 | 4/2018 | Ismael |
| 9,934,381 | B1 | 4/2018 | Kindlund et al. |
| 9,946,568 | B1 | 4/2018 | Ismael et al. |
| 9,954,890 | B1 | 4/2018 | Staniford et al. |
| 9,973,531 | B1 | 5/2018 | Thioux |
| 10,002,252 | B2 | 6/2018 | Ismael et al. |
| 10,019,338 | B1 | 7/2018 | Goradia et al. |
| 10,019,573 | B2 | 7/2018 | Silberman et al. |
| 10,025,691 | B1 | 7/2018 | Ismael et al. |

(56) References Cited

U.S. PATENT DOCUMENTS

| | | |
|---|---|---|
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,586,046 B1 * | 3/2020 | Herman-Saffar ....... G06F 21/57 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |

(56) References Cited

U.S. PATENT DOCUMENTS

| | | |
|---|---|---|
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Froyansky |
| 2009/0241190 A1 | 9/2009 | Fodd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Kue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |

(56) References Cited

U.S. PATENT DOCUMENTS

| | | |
|---|---|---|
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Viz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2020/0364238 A1* | 11/2020 | Cruanes ............ G06F 16/24545 |

FOREIGN PATENT DOCUMENTS

| | | |
|---|---|---|
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edU/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990274, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information". Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

(56) References Cited

OTHER PUBLICATIONS

Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard fora NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).

\* cited by examiner

SYSTEMS AND METHODS FOR AUTOMATED CYBERSECURITY ANALYSIS OF EXTRACTED BINARY STRING SETS

FIELD

Embodiments of the disclosure relate to the field of cybersecurity. More specifically, certain embodiments of the disclosure relate to a system, apparatus and method for an automated analysis of an extracted set of strings.

BACKGROUND

Over the last decade, malicious software (malware) has become a pervasive problem for Internet users and system administrators of networks devices. To counter this increasing problem, computer files are often inspected to verify that they do not contain any malware. Malware analysts, reverse engineers, forensic investigators, and incident responders have developed an arsenal of tools at their disposal to dissect malware and examine it for potential threats or other indications of source.

A "string" is a data type that comprises any finite sequence of characters (i.e., letters, numerals, symbols and punctuation marks). Data types are frequently used in programming languages as a way of categorizing data. Data types can differ according to the programming language used, however strings are implemented as a data type in virtually every programming language. The characters within strings are typically encoded in accordance with the American Standard Code for Information Interchange (ASCII) standard which establishes a relationship between the binary values stored within data and a pre-established set of characters. Other encodings and standards can be used to format strings including the Extended Binary Coded Decimal Interchange Code (EBCDIC) and UNICODE. Strings can be used for many purposes within computer files, including, for example encoding text relating to an error message that is displayed to the user upon triggering, a registry key, a uniform resource locator (URL) link, or a directory location for where to copy or store data within a computer system.

Malware analysis tools can examine strings contained within software binaries, namely any type of executable code including an application, script or any set of instructions. This examination may aide in gathering clues about the binary's function, threat level, design detection methods, and how containment of any potential damage may be achieved. For example, strings that contain filenames, internet protocol (IP) addresses, Uniform Resource Locators (URLs), domain names or the like may constitute indicators of compromise, and thus, are associated with a higher relevance to cybersecurity than strings that contain, for example, random sequences of characters. By analyzing suspicious binaries with a string extractor, a listing of the strings found within that binary can be generated. However, as the complexity of software and other binaries increases, the amount of strings to be reviewed as well as the effort required to determine relevance also increases. Hence, there is a need for a system to automatically locate and analyze sets of strings contained with various suspicious binaries under review.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
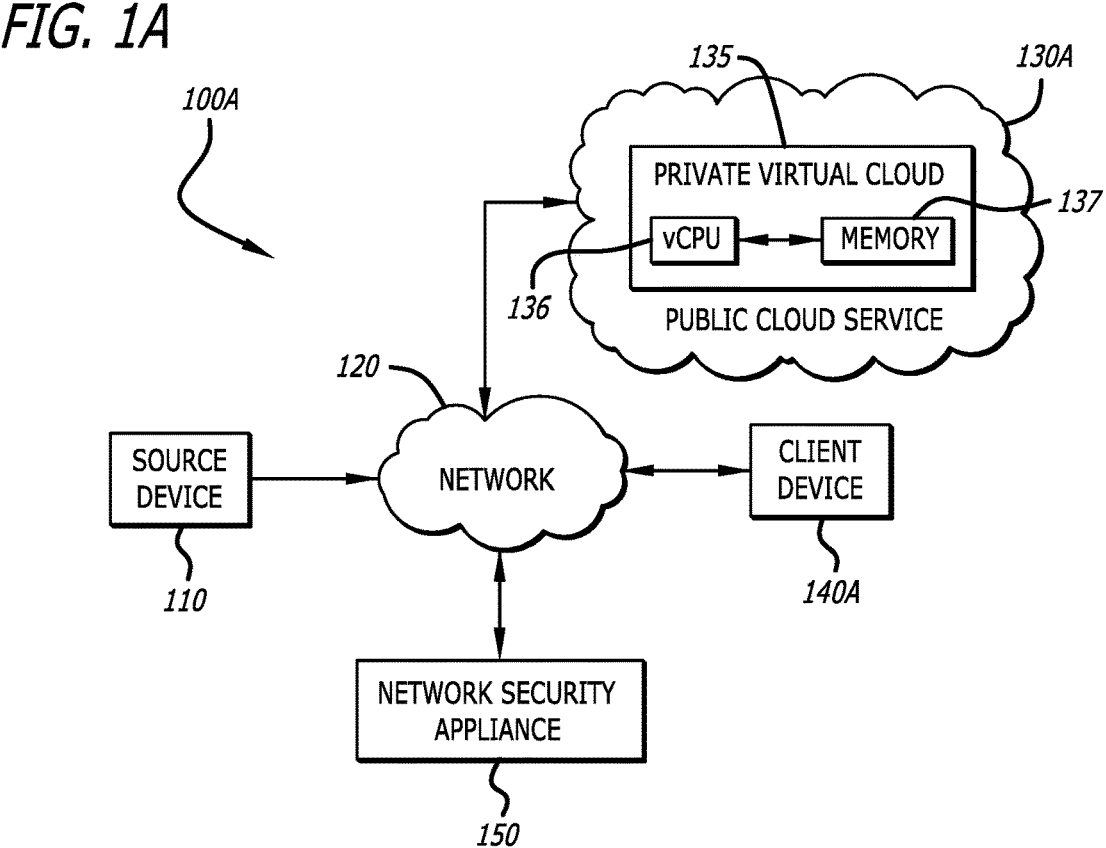
FIG. 1A depicts an exemplary system diagram of a cloud-based automated string analysis system in accordance with various embodiments of the invention.

Various embodiments of the disclosure relate to an automated system and/or process configured to analyze extracted string sets. This can be accomplished by generating a ranked list of extracted strings for use by various security systems and users within the cybersecurity field. According to one embodiment of the disclosure, the ranked list of extracted strings can be generated by ordering the extracted strings contained within a binary based on a generated threat detection score that corresponds to the likelihood of the string being associated with a risky or otherwise malicious action within the binary.

One of the tools malware analysts typically used when attempting to examine strings located within suspicious binaries is STRINGS.EXE from Sysinternals (a business unit of the Microsoft Corporation of Redmond, Wash.). STRINGS.EXE is an analytic software tool that is configured to receive a passed-in binary and scan it for embedded ASCII or UNICODE strings located within. However, certain analytic tools, such as STRINGS.EXE for example, may simply scan, extract, and generate an unordered list of strings that were located within the passed-in binary. No further analysis is done. By default, certain analytic tools, such as STRINGS.EXE identify strings as any sequence of characters comprising three or more consecutive characters followed by a null terminator. This type of indiscriminate string identification typically leads to the generation of noisy data sets since many of the extracted strings can be irrelevant, and thus obscure the highly relevant strings within the extracted string set.

For example, a set of consecutive bytes within a binary may be interpreted as a set of ASCII characters by STRINGS.EXE and thus be added to the list of extracted strings. However, the consecutive bytes may not actually represent a string of ASCII characters relevant for malware analysis, but instead represent irrelevant data such as a memory address, central processing unit (CPU) instruction, or other non-string data utilized within a program. As a result, string sets generated from analytic tools, such as STRINGS.EXE for example, often require human analysts to manually examine the extracted string sets in order to determine if relevant strings for malware analysis are present. The process of extracted string set analysis, which includes understanding and scoring the relevance of various extracted strings, along with manually generating a threat score often requires highly experienced human analysts. As a result, obtaining quality security-relevant scored data can be time consuming and expensive to obtain. Often, within an extracted string set, the frequency of relevant strings occurring within a set are disproportionately less than irrelevant strings. Additionally, during the manual analysis, variations may exist between the subjective opinions of various human analysts as to what strings constitute potential threats compared to other strings, based on differing past experiences or biases.

As the complexity of software and other binaries increases, the amount of time needed to manually analyze the extracted string sets also grows. Furthermore, as these extracted string sets grow in size, human error during the manual analysis process can also increase. For example, a human analyst may inadvertently skip over relevant strings during the manual review of the string set due to fatigue. Having an automated process to analyze extracted string sets may aide malware analysis by freeing up human analysts to examine other threat indicators of a suspicious binary under analysis.

Generating heuristic rules to robustly account for all possible variations of string combinations that may be extracted from suspicious binaries would be a monumental task. Thus, embodiments disclosed herein utilize automated machine learning frameworks to analyze extracted string sets and generate a ranked list output based on generated threat prediction scores. Many of the embodiments utilize an automated learning to rank (LTR) method to generate a potential threat score and utilize this score to create a ranking for each string extracted from a suspicious binary. LTR methods incorporate supervised machine learning procedures that utilize previously scored data to generate a prediction model that can then be used to predict a score for a new, previously unanalyzed data set (i.e. query) which can then be ranked based on the predicted score. Since the ranking (in many embodiments described herein) is related to the predicted threat scores of the extracted strings, the LTR ranking can be utilized to generate a ranked list of extracted strings. The rank list is an arrangement (i.e., ordering) of the strings according to rank. That is, a sequential arrangement based on the predicted scores of the extracted strings. For example, strings at the beginning of the ranked list can correspond to strings with a higher threat prediction score than subsequent strings in the list. As a result, rankings generated from the disclosed automated methods can be used to generate a ranked list of extracted strings which can subsequently be incorporated into a threat warning for further analysis or presentation to a threat detection system or human analyst.

LTR methods typically generate a prediction model function from known training data sets. The generated prediction model function can then receive new input data and output a score associated with the input data. The generation of a prediction model function is typically done by utilizing a large set of training data that have previously been analyzed and scored, often by a human analyst. Training data can be obtained from historical data generated from prior analyses. Once the prediction model has been generated, new data sets may be processed with the prediction model in order generate predictive scores for these new data sets without the need for human intervention. Embodiments herein utilize prediction models generated via automated machine learning methods to generate prediction scores associated with potential threat levels. By ranking strings extracted from a suspicious binary based on the predicted potential threat levels, the ranked strings at the beginning portion of the ranked string list are more likely to be relevant to further malware analysis compared to the strings in the later portion of the list.

Extracted strings can be expressed as feature data relating to features of the extracted strings. Feature data is typically represented as a number or other designation that correlates with a particular characteristic of the string. For example, a feature could be associated with the string that denotes the number of characters in the string, how many characters of a certain type are present, or if the string reads as natural language (denoting higher relevance) or as gibberish (denoting lower relevance). This type of feature extraction can be accomplished by utilizing natural language processing tools. In this way, some embodiments may generate a machine learning prediction model that utilizes feature data to further minimize the influence of irrelevant strings or random sequences of characters not probative of a cyberattack or otherwise meaningful to cybersecurity. Additionally, in certain embodiments, the automated LTR prediction model may utilize similar string feature data comprised within training data to create a prediction model that can analyze an extracted string against historical threat prediction scores, along with string feature data to generate threat prediction scores with increased accuracy.

In certain embodiments, the generated prediction model may utilize a gradient boosted decision tree (GBDT) method for the machine learning prediction model. LTR systems can be understood as a pairwise classification system, meaning that the system evaluates pairs of items (e.g., extracted strings) from a set at a time and iteratively computes the optimal ranking for all pairs of items (e.g., extracted strings) within a set to come up with a final ranking for the entire set. GBDT methods generally incorporate individual decision trees to facilitate prediction score generation by using a weighted sum of the leaves of each decision tree. GBDT methods can classify each pair of extracted strings as correctly or incorrectly ranked, and use the optimal ordering of each pair of extracted strings to come up with the final ranking for all of the extracted strings within the extracted string set.

Once a suspicious binary has been fully processed and the associated extracted strings ranked with corresponding predicted threat values, a threat warning can be generated. Threat warnings may utilize predetermined rule sets or thresholds to process the ranked extracted string set. In some embodiments, the suspicious binary is initially analyzed in response to a user request (where the "user" may be, e.g., a computer user, security analyst or system admin) and the threat warning is then utilized for the generation of a threat report that is presented to the user. In other embodiments, in response to a predicted threat level that is beyond a predetermined threshold, the threat warning may be utilized to create a remedial action. In certain cases, a score for a single string (e.g., a reference to a particular, known sensitive memory address, etc.) may be enough to generate a remedial action on the entire binary.

Threat warnings can be utilized to generate threat reports, emails, or other communications presented (e.g., displayed or sent) to a user informing them of the results of the analyzed extracted strings within the suspicious binary. These threat warnings can be utilized, in various embodiments, to auto-generate the threat report, email, or other communication informing the user of the results of various analyses. In certain embodiments, the threat warnings can also be reported to outside third parties.

Threat warnings may also be utilized to update remedial action behaviors as responses to newly determined threats as they are identified, such as, but not limited to, a new malware attack having a particularly new threat pattern. In some embodiments, remedial actions may be taken without human intervention. In further embodiments, the string analysis logic may be given a set of pre-defined thresholds and/or rules that may empower the generated threat warnings to initiate remedial actions immediately based on the predicted threat data derived from the suspicious binary. Remedial actions may include, but are not limited to, quarantining the suspicious binary within a system, or halting any processing of the binary.

It should be understood that threat warnings are utilized by varying types of users with unique needs. For example, malware analysts are typically skilled at reading strings. Such malware analysts typically examine string threats as leads for deeper analysis of the suspicious binary which can lead to a variety of outcomes including classification of the malware, verification that the suspicious binary is in fact malware, or mapping of the malware to a certain family. Security operations center (SOC) analysts generally respond to alerts coming into the system. These alerts are typically examined to determine if a suspicious binary needs to be escalated for further review. SOC analysts can benefit from concise, pre-generated threat reports incorporating ranked string lists that can focus their attention on relevant strings. Specifically, utilizing the methods and systems described herein can reduce the time needed for intervention by a SOC analyst. Incident response (IR) consultants conduct investigations of specific incidents of intrusions and other cyber-attacks in progress or having occurred, and how to remediate them. For these users, having a focused ranked set of strings can help determine where the malware may be on other areas or systems within the network. Finally, threat intelligence analysts typically want to know if a piece of discovered malware is related to other known pieces of malware. By looking at a ranked string list, the threat intelligence analyst may be able to see similar strings as those found in previous malware, which can help indicate similar origins.

Another aspect of the invention is that the resulting prediction models that are generated for predicting threats on new suspicious binaries can be analyzed, verified, and compared quantitatively. By using such quantitative methods, the prediction model's performance can be assessed and given a value to compare to other models. In some embodiments, the quantitative method utilized is a mean normalized discounted cumulative gain (MNDCG) method that generates a score of each item within a generated prediction model. Broadly, this method examines the magnitude of each string's relevance summed over the entire string set, which can be represented as a non-negative number called the "cumulative gain". The MNDCG method can then discount these results within the prediction model in a typically logarithmic fashion so as to reflect the goal of having the most relevant strings appear, for example, towards the top of the predicted ranking. That output is normalized so the results of the MNDCG method can be compared to other generated prediction models of varying size. Finally, the quantitative evaluation can limit a certain number of strings of a binary from appearing at (or near, e.g., within a predetermined distance (i.e., number of strings) from) the top of the ranked string list to help limit the computational requirements needed (as some suspicious binaries may have thousands or tens of thousands of binaries). For example, the quantitative analysis results may limit the output to the first 100 strings of a binary within a ranked string list, but could be adjusted via a user interface by an analyst examining the suspicious binary.

It is understood that the process described herein provide for a more efficient and robust method of providing ranked strings sets for malware analysis in an automated fashion. The automated generation of threat predictions scores on new, previously unranked string sets which can be utilized to rank and generate threat warnings can provide a more accurate threat assessment of suspicious binaries as well as increasing efficiency through reducing the time needed for a human analyst to review the set. This facilitates the practical application of providing more efficient malware detection.

I. Terminology

In the following description, certain terminology is used to describe features of the invention. For example, in certain situations, the term "logic" is representative of hardware, firmware or software that is configured to perform one or more functions. As hardware, logic may include circuitry such as one or more processors (e.g., a microprocessor, one or more processor cores, a virtual central processing unit, a programmable gate array, a microcontroller, an application specific integrated circuit, etc.), wireless receiver, transmitter and/or transceiver circuitry, semiconductor memory, combinatorial logic, or other types of electronic components.

As software, logic (or "engines" in certain descriptions) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, cloud-based storage medium, or transitory storage medium (e.g., electrical, optical, acoustical or other form of propagated signals such as carrier waves, infrared signals, or digital signals). Examples of non-transitory storage mediums may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of a network device executing application software in a malicious manner; (2) alters the functionality of a network device executing application software without any malicious intent; and/or (3) provides an unwanted functionality which is generally acceptable in other contexts.

The term "object" generally refers to content in the form of an item of information having a logical structure or organization that enables it to be classified for purposes of analysis for malware. One example of the object may include an email message or a portion of the email message. Another example of the object may include a storage file or a document such as a PHP or other dynamic file, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the network device. Network content such as webpages and other downloaded content may be further examples of objects analyzed for malware.

The term "binary" embraces a computer program code that represents text, computer processor instructions, or any other data using a two-symbol system, such as, for example, "0" and "1" from the binary number system. A binary code assigns a pattern of binary digits, also known as bits, to each instruction. Binary codes are used to encode data, such as each digit or character, into bit strings of fixed-width or variable width, depending on the implementation. The term "binary", as used herein, may also designate an executable or interpretable computer processor instruction, regardless of whether in a two-symbol system, depending on context of its use in this description. For example, a "binary" may refer to any non-text file, but which may nevertheless comprise embedded text as strings. One example of a non-text file that may contain embedded strings is a text-editor file that comprises not only the text within the document, but also includes data related to formatting the text within the program. Binaries may include a variety of types of objects, such as executables, applications, programs, scripts, etc. It is understood that the term binary may include partial, corrupt, or otherwise incomplete files.

The term "cloud-based" generally refers to a hosted service that is remotely located from a data source and configured to receive, store and process data delivered by the data source over a network, including a self-hosted and third-party hosted service. Cloud-based systems may be configured to operate as a public cloud-based service, a private cloud-based service or a hybrid cloud-based service. A "public cloud-based service" may include a third-party provider that supplies one or more servers to host multi-tenant services. Examples of a public cloud-based service include Amazon Web Services® (AWS®), Microsoft® Azure™, and Google® Compute Engine™ as examples. In contrast, a "private" cloud-based service may include one or more servers that host services provided to a single subscriber (enterprise) and a hybrid cloud-based service may be a combination of both a public cloud-based service and a private cloud-based service.

The term "network device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of a network device may include, but are not limited or restricted to, the following: a server or other stand-alone electronic device, a mainframe, a firewall, a router; an info-entertainment device, industrial controllers, vehicles, or a client device (e.g., a laptop, a smartphone, a tablet, a desktop computer, a netbook, gaming console, a medical device, or any general-purpose or special-purpose, user-controlled electronic device).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. System Architecture

Referring to FIG. 1A, an exemplary system diagram of a cloud-based automated string analysis system 100A is shown. The string analysis can be accomplished within a private virtual cloud system 135, which, in an embodiment, may be provided within a larger public cloud service 130A. In many embodiments, a client device 140A communicatively coupled to the public cloud service 130A via a network 120 can receive a suspicious binary from a source device 110 which is also communicatively coupled to the network 120. In response to receiving a suspicious binary, the client device 140A can send the binary to the public cloud service 130A which forwards it to the private virtual cloud 135.

The private virtual cloud 135 and associated resources can be generated as part of an Infrastructure-as-a-Service (IaaS) model and comprise at least one instance of a vCPU 136 and a memory 137 communicatively coupled to the vCPU 136. It would be understood by those skilled in the art that the private virtual cloud 135 may comprise a variable number of vCPUs and memory stores as needed based on various factors including, but not limited to, the current available computing resources available on the system, or the current computational demands placed upon the private virtual cloud 135.

The memory 137 can have string analysis logic to direct the vCPU 136 to process the received suspicious binary. In response, the vCPU 136 extracts the strings from the suspicious binary, generates a prediction model for evaluating the extracted strings, and processes the suspicious binary through the prediction model function to generate a list of prediction scores that can be utilized to generate a ranked list of strings taken from the suspicious binary that correlate to the perceived threat of each string. The ranked list of extracted strings can then be utilized to generate an overall threat warning for the suspicious binary. In certain embodiments, the ranked list of extracted strings may be sent back to the client device 140A for further processing. In various embodiments, the string analysis of the suspicious binary may result in a determination that the binary poses an immediate threat such that remedial action should be taken, which may then occur or be communicated to the client device 140A for further action. In further embodiments, the resulting ranked string list may be sent to a third party, such as cybersecurity vendors, or other external threat analysts for evaluation in a threat report. In certain embodiments, the memory 137 comprises prediction model generation logic that may utilize public data, non-public data, or a mixture of both to generate a prediction model function that can be accessed or otherwise provided to a client device 140A for supplementing string analysis logic within the client device 140A. In certain embodiments, the prediction model may be sent to an analyst station or admin for continued action such as further threat analysis and/or remediation.

In some embodiments, the private virtual cloud 135 may be accessed by a network security appliance 150 which may require assistance in evaluating the threat of a suspicious binary received from a source device 110. Embodiments relating to the network security appliance 150 can behave similarly to the embodiments of the client device 140A such that communication between the network security appliance 150 and private virtual cloud 135 is analogous to the communication between the client device 140A and private cloud server 135.

Figure 1B:
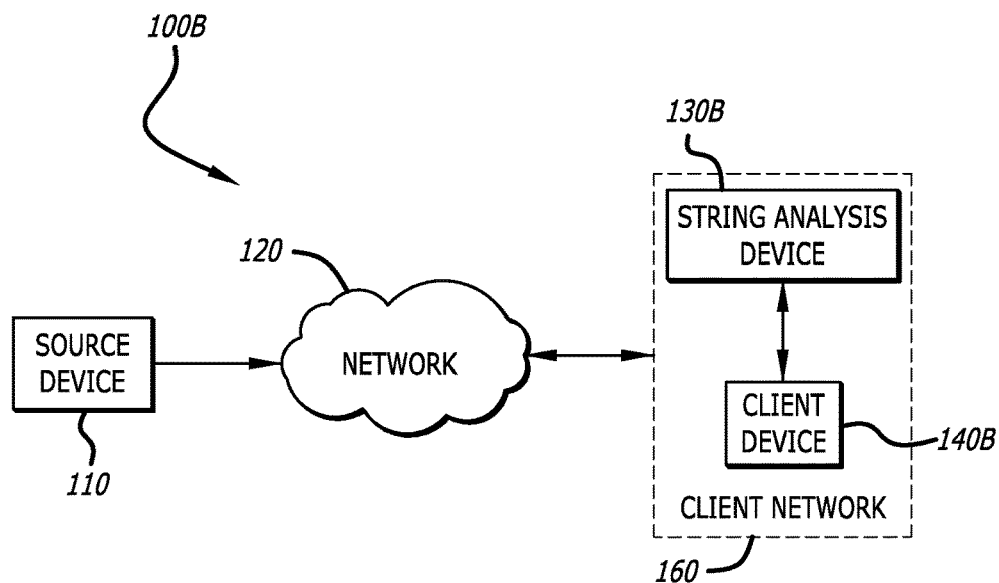
FIG. 1B depicts an exemplary system diagram of a device-based automated string analysis system in accordance with an embodiment of the invention.

Referring to FIG. 1B, a system diagram of a device-based automated string analysis system 100B is shown. The string analysis device 130B can be located within a client network 160 and be in communication with at least one client device 140B. As the client network 160 receives a suspicious binary from the source device 110 over a network 120, the client device 140B can pass the binary to the string analysis device 130B for processing.

Similar to the embodiments discussed above with respect to FIG. 1A, communication between the client device 140B and the string analysis device 130B may be analogous to the above description of the communication between the private virtual cloud 135 and the client device 140A of FIG. 1A. As would be understood by those skilled in the art, the client network 160 may comprise any number of devices, including multiple client or network devices. Additionally, the string analysis device 130B may also operate as a subsystem of a larger network security appliance within the client network 160. In further embodiments, the string analysis device 130B may be implemented as a virtual instance (i.e. software) that runs on the client device 140B.

Figure 1C:
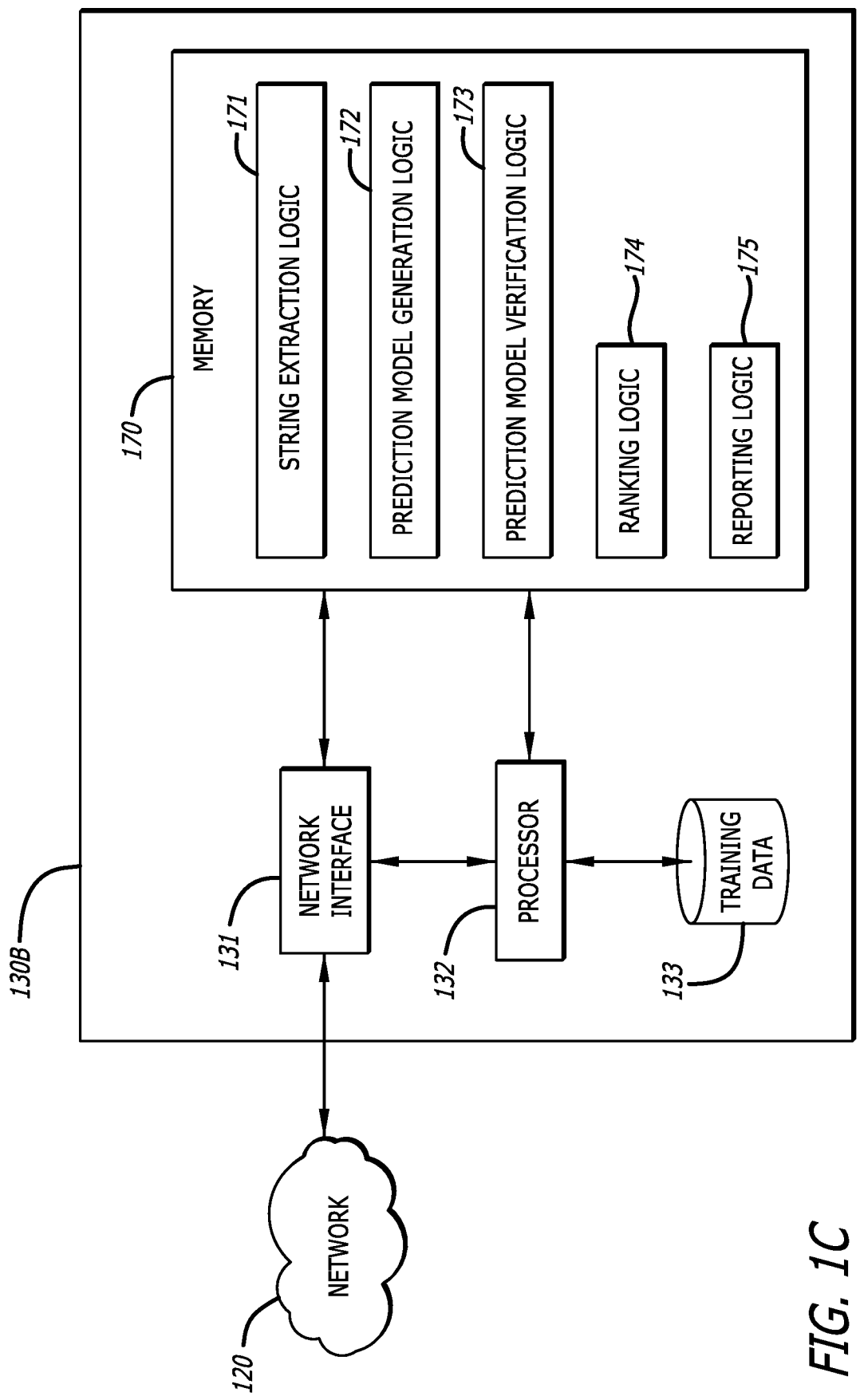
FIG. 1C depicts an exemplary hardware block diagram of an automated string analysis device in accordance with an embodiment of the invention.

Referring to FIG. 1C, a hardware block diagram of an automated string analysis device 130B is shown. The string analysis device 130B comprises a network interface 131 which can be utilized to connect to the network 120 for communication similar to the discussion of FIG. 1A. The string analysis device 130B further comprises a processor 132, memory 170, and training data store 133 which are all in communication with each other. The memory further comprises a plurality of logics including, but not limited to, string extraction logic 171, prediction model generation logic 172, prediction model verification logic 173, ranking logic 174, and reporting logic 175.

The string analysis device 130B can receive suspicious binaries from the network 120 via the network interface 131. In response, the processor 132 can be instructed by the string extraction logic 171 to extract the strings found within the suspicious binary. Once extracted, the prediction model generation logic 172 can utilize training data within the training data store 133 to generate a prediction model. It is contemplated that various embodiments of the string analysis machine 130B may utilize the prediction model generation logic 172 to retrieve a pre-generated prediction model from an external source over the network 120 instead of generating a new model internally. In fact, certain embodiments of the string analysis device 130B may not comprise a training data store 133 and instead can retrieve data (if needed) via a remote connection over the network 120.

Once generated or retrieved, the prediction model can be verified via the prediction model verification logic 173. The verification may be accomplished using verification data either extracted or derived from the training data, or via a specialized set of verification data that may be stored on the training data store 133 or on a remote device. The ranking logic 174 can be utilized to rank a set of strings based on the prediction model either during the verification process or during general analysis of strings extracted from suspicious binaries. The output of the ranking logic 174 can be analyzed by the reporting logic 175 to determine if a report should be generated, and if so, what actions to take. For example, the ranking of a set of strings may require that a threat report should be sent to an analyst for further evaluation. Ranked string sets may also be determined to contain strings that trigger a pre-determined rule (such as strings that are directed to specific, crucial locations within memory) that require the reporting logic 175 to trigger at least one remedial action, sometimes independently without human intervention. As those in the art will understand, the reporting logic 175 can be configured to generate and respond to a number of various threats in a variety of ways that can minimize the potential threat of malware determined to be contained within the suspicious binary.

It should be understood that although certain embodiments are highlighted in discussion of FIGS. 1A-1C, a wider variety of embodiments are possible and contemplated by this application. In fact, based on the desired application and layout, a mixture of client devices, source devices, and other components can be utilized in order to provide an automated system to analyze extracted strings.

III. Training and Prediction

Figure 2:
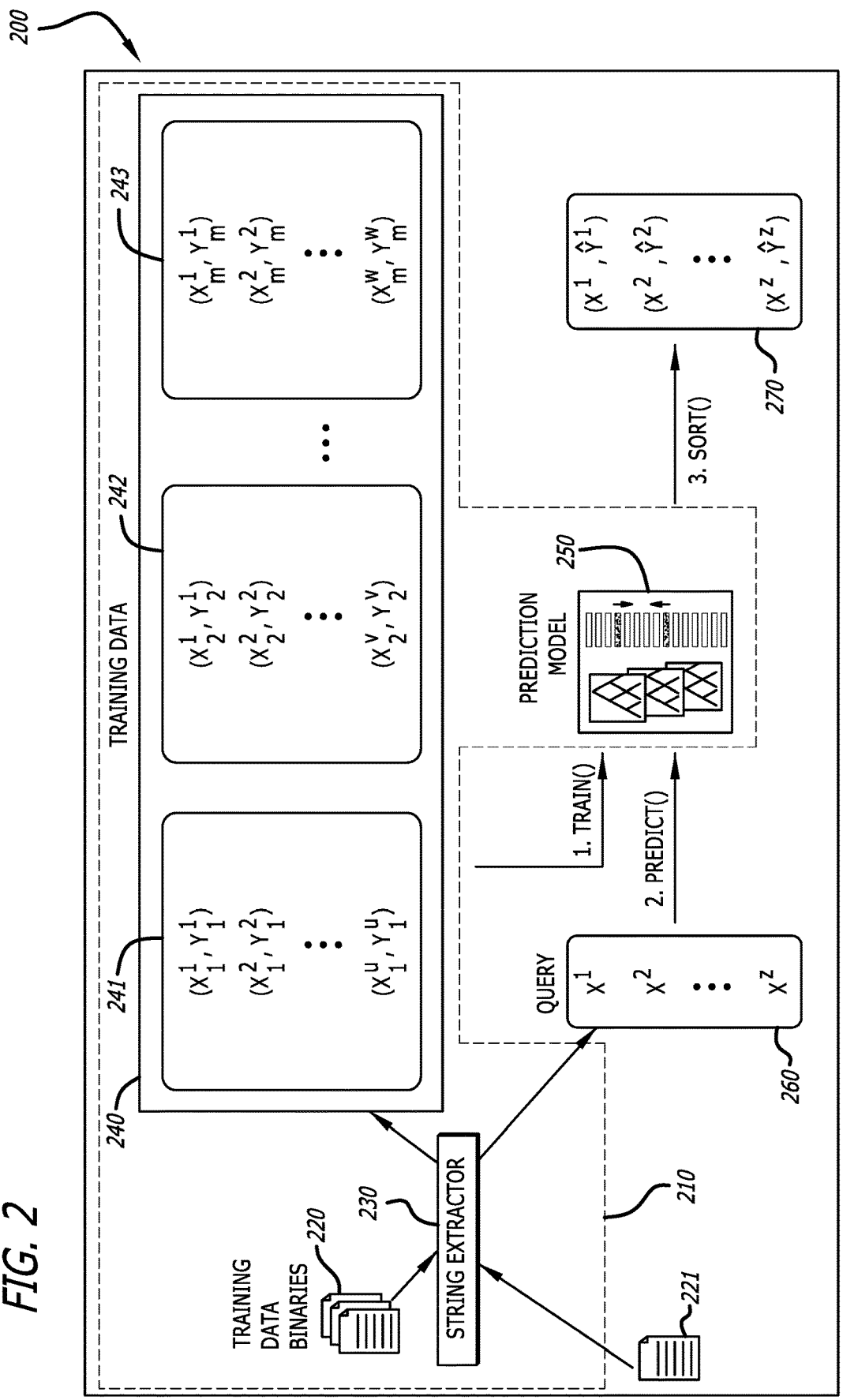
FIG. 2 depicts an exemplary block diagram of an automated string analysis process in accordance with an embodiment of the invention.

Referring to FIG. 2, an exemplary block diagram of an automated string analysis process 200 is shown. Broadly, the process of string analysis can be understood to comprise two phases: training and predicting. Before predictions can be made, a prediction model 250 must be generated in the training phase 210. In order to better visualize the string analysis process 200, the elements associated with the training phase 210 are bounded by a dashed line. Training data binaries 220 are gathered and processed through a string extractor 230. The output of the string extractor 230 comprises a set of strings which are then, in many embodiments, evaluated by human analysts for relevance related to potential malware threats.

A plurality of these analyzed string sets 241-243 are conceptually shown in FIG. 2 as lists comprising rows of two associated elements. The left "X" element represents a string extracted from the training data binaries 220, while the right "Y" element corresponds to a score assigned to the string by a human analyst. Scores are often assigned as a non-negative integer number that corresponds to the string's relevance for malware analysis. In some embodiments, additional elements may be present in the analyzed string sets 241-243 that represent values associated with features of the string.

Each element in the analyzed string sets 241-243 comprises both a superscript and a subscript. The superscript denotes the rank of the element in the binary so the first row has a superscript of 1, the second row has a superscript of 2, and so on until the last row u is reached. Each analyzed string set 241-243 may have variable lengths which are denoted by the variables u, v, and w. The subscript denotes the number of the training files within the training data 240. Therefore, the first analyzed string set 241 has a subscript of 1 on every element, the second analyzed string set 242 has a subscript of 2 on every element, up to the last analyzed string set 243 which has a subscript of m denoting that the number of analyzed string sets within the training data 240 can be variable and may include large numbers of sets. In fact, in order to increase the robustness of the prediction model 250 generated from the training data 240, the training data 240 may include a large number of previously analyzed and ranked string sets ("labelled" string sets).

With the training data 240 comprising a plurality of analyzed string sets 241-243 generated from the training data binaries 220, the string analysis process 200 can generate a prediction model 250 that can be utilized to create prediction scores on subsequent binary strings. In many embodiments, prior to predicting subsequent strings, the prediction model 250 can undergo a verification process. Verification can occur in many ways, but may be accomplished by directing the prediction model to process at least one (but likely many) verification data sets. A verification data set can be a set of unranked strings which have previously been ranked and analyzed manually. Upon processing of the verification data set by the prediction model 250, the system 200 or analyst may compare the sorted data set 270 generated from the verification data set to the known ranking of the verification data set. In this way, the prediction model 250 can be verified for accuracy and, in certain embodiments, may be adjusted based on the processing of the verification data set. In further embodiments, the verification process may occur automatically based on a set of pre-determined heuristics or thresholds.

The subsequent binary strings for processing by the prediction model 250 may be pre-ranked string sets used to verify the prediction model 250 for accuracy in ranking (as described above), or unranked string sets encountered for example in a private network and potentially representing cybersecurity threats. The embodiment shown in FIG. 2 illustrates decision trees similar to GBDT methods that create an ordered ranking of the analyzed string sets 241-243 within the training data 240. Once the ranking is compete and the prediction model has been generated, the training phase is complete and moves into the prediction phase.

A suspicious binary 221 can be processed through the string extractor 230 to generate a new list of strings, commonly called a query 260. As denoted in FIG. 2, the query 260 has a superscript to denote the initial ordering of the strings (typically the order in which they were discovered during the string extraction). The number of elements in the query 260 can vary based on the size of the suspicious binary 221 and does not have to be similar in size to the analyzed string sets 241-243 in the training data 240. When the query 260 has been fully generated, it can be passed to the prediction model 250 for processing and prediction. The prediction model 250 typically takes each element of the query 260 and assigns a score (denoted as $\hat{Y}$) that is predicted for the string.

Once each element of the query 260 has been processed and received a score from the prediction model 250, the string analysis process 200 can perform a ranking of the elements based on the predicted scores for each element. The final ranked string list 270 comprises rows of a string element "X" and a predicted score element $\hat{Y}$. The superscript on each element of the row denotes its ranking within the ranked string list 270. Since the score elements correspond to the string's relevance for malware analysis, it can be understood that strings with a higher ranking will have more relevance for further analysis than strings with a lower ranking. The ranked string list 270 can then be utilized to create a threat warning which may be utilized to generate a threat report or other remedial action in response to the presence of a predicted score higher than a pre-determined threshold. The generation of prediction models utilizing string features is discussed in more detail below.

Figure 3:
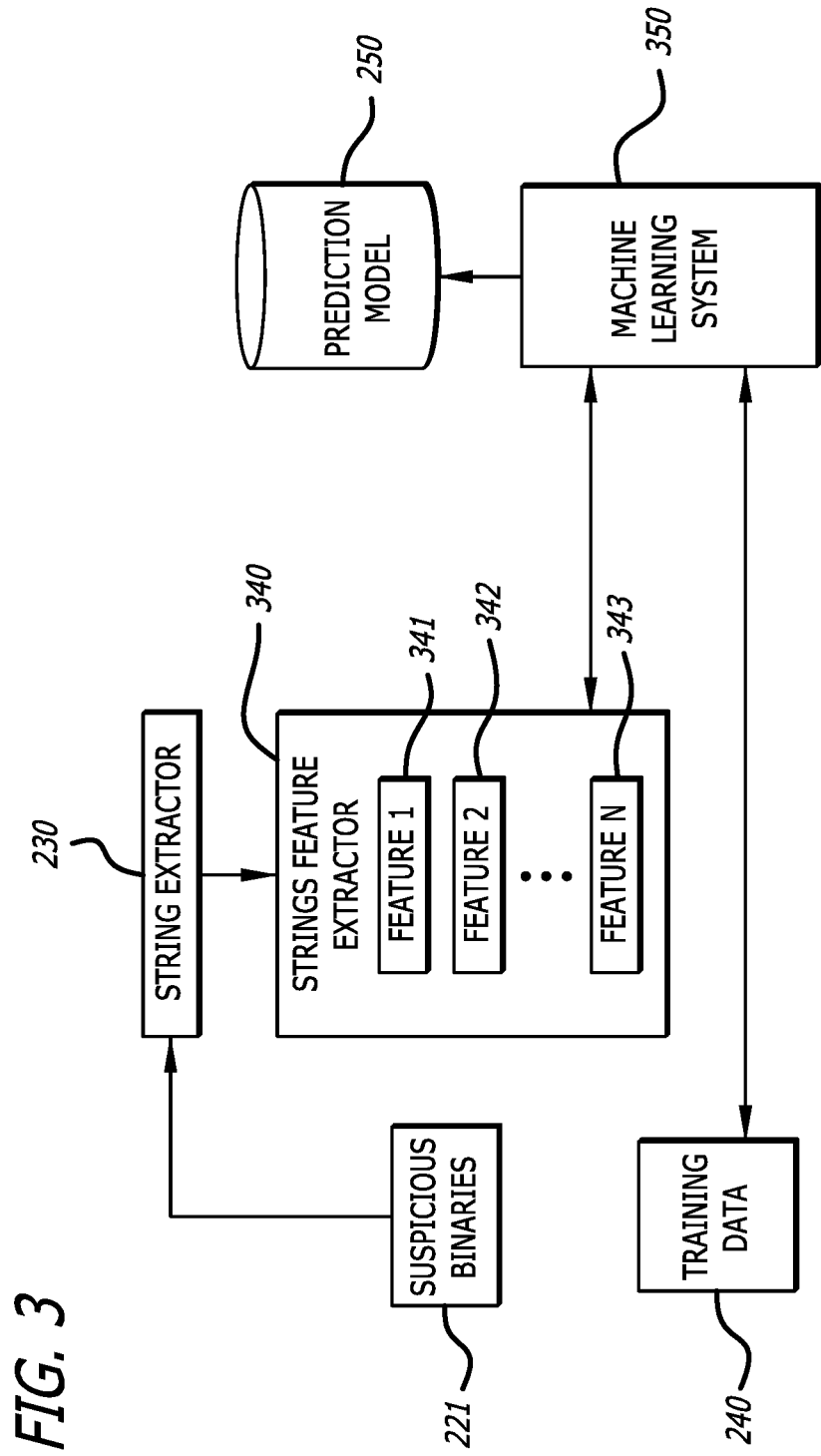
FIG. 3 depicts an exemplary block diagram of automated prediction model generation utilizing string feature extraction in accordance with an embodiment of the invention.

Referring to FIG. 3, an exemplary block diagram of automated prediction model generation utilizing string feature extraction is shown. Typically, a machine learning system 350 will access a set of training data 240 to begin the process of generating a prediction model 250. As discussed above, the training data 240 typically consists of a series of extracted string sets that have been previously analyzed and scored by human analysts or automated heuristics. The training data 240 is typically comprised of pairs of extracted strings and associated threat scores. The number of extracted strings within the training data 240 can be of any size, including, but not limited to, tens of millions of strings. Large amounts of training data can often lead to more accurate predictions. For example, as a training data set increases in size, biases within the human analysts who scored the training data are often diminished. As more data points associated with the training data are obtained or utilized within the prediction model 250, the overall error in the predicted score of a new query will generally be reduced. Data points may be expressed through the use of string features.

In many embodiments, the machine learning system 350 can process the strings associated with the training data 240, and extract features from the strings via a feature extractor 340. In other embodiments, the training data 240 already comprises feature data associated with each string. The machine learning system 350 can then generate a prediction model 250 which can accept a new query with extracted strings and associated string features and generate a predicted threat score and ranking to associate with that string.

Once received, a suspicious binary 221 can be analyzed by first extracting the strings within the suspicious binary 221 via the string extractor 230. Each located string within the suspicious binary 221 can then utilize a strings feature extractor 340 to determine various features 341-343. It should be understood that the number of features extracted can vary depending on the needs of the application. For example, fewer features can be extracted and utilized when computational resources or time is limited. However, more features may be utilized if the extracted string set is very large and increased differentiation between the string threat levels is needed.

By way of example and not limitation, a first feature 341 may be the length of the string. Strings of increased length may correspond to varying levels of threats. A second feature 342 can relate to the type of string. Strings that have been determined to contain natural language elements may be given a certain value compared to strings comprising random characters. String features can be derived from any meaningful distinction that varies between strings and that can be assigned a numerical value for comparison within the prediction model 250. Once all features 341-343 have been extracted from the set of strings located within the suspicious binary 220, the resulting query can be passed to the machine learning system 350 for processing within the prediction model 250 which generates a prediction score for each string. These generated prediction scores can be utilized to create a ranked string list for use in generating threat warnings. A simplified example of a ranked string list that can be generated with this method is discussed below.

Figure 4A:
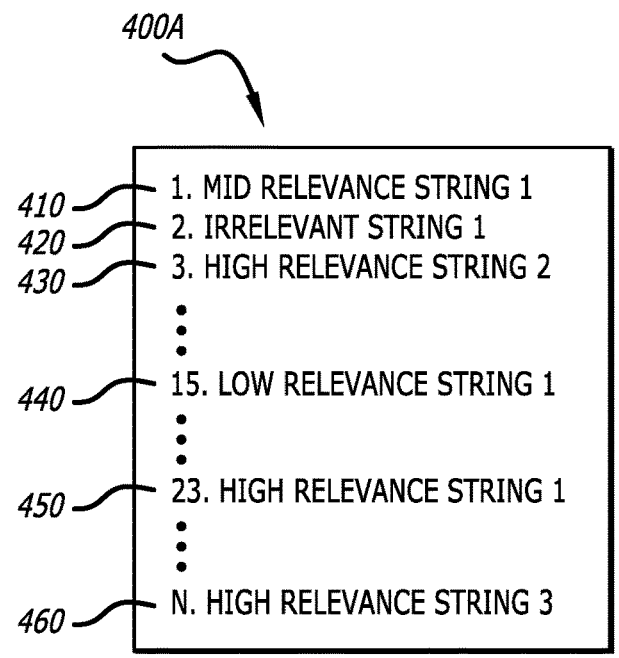
FIG. 4A depicts an exemplary simplified list of extracted strings prior to automated analysis in accordance with an embodiment of the invention.

Referring to FIG. 4A, an exemplary simplified list of extracted strings 400A prior to automated analysis is shown. The list of extracted strings 400A omits showing all rankings in order to reduce complexity, but it is understood that every slot position between the first slot and the last slot corresponds to an extracted string. In the list of extracted strings 400A, there are various strings that can be classified as having high, mid, or low relevance while some strings are classified as being irrelevant in regards to malware analysis.

It is understood that the placement of each string in an unranked set of extracted strings generally correspond to the order in which the strings were located and processed by the string extractor. It should also be understood that the determination of relevance is typically not known at this point prior to analysis and ranking, but is present in FIG. 4A to highlight the processing of the list from an unranked to the ranked state shown in FIG. 4B.

In this example, the first slot in the list of extracted strings 400A corresponds to a first string that has a mid-relevance 410, the second slot corresponds to an irrelevant string 420, and the third slot corresponds to a high relevance string 430. Lower in the list, the fifteenth slot of the list of extracted strings 400A corresponds to a first low relevance string 440. Further down, the twenty third slot corresponds to another high relevance string 450, while the last slot corresponds to a third high relevance string 460. It should be understood that the length of the list of extracted strings 400A can be of any length depending on the number of strings located within a given suspicious binary. The list of extracted strings 400A can be processed by the string analysis logic to create a ranked list of extracted strings such as the one in FIG. 4B.

Figure 4B:
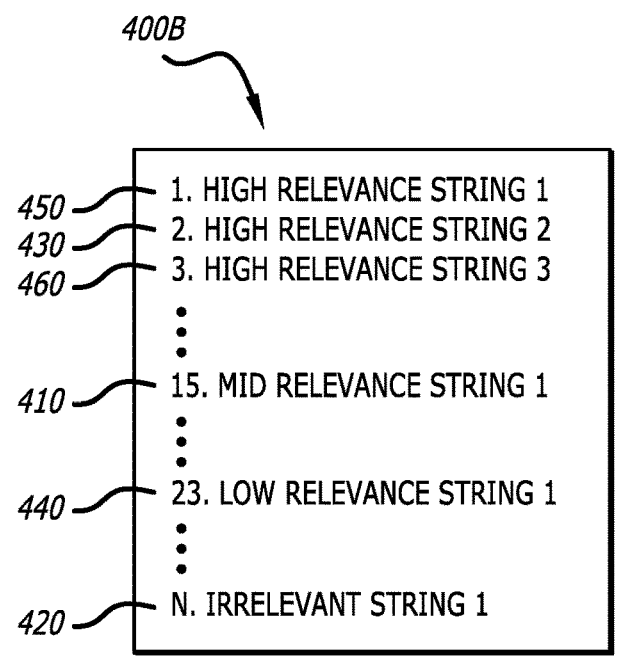
FIG. 4B depicts an exemplary simplified ranked list of extracted strings after automated analysis in accordance with an embodiment of the invention.

Referring to FIG. 4B, an exemplary simplified ranked list of extracted strings after automated analysis is shown. Similar to the list of extracted strings 400A of FIG. 4A, the ranked list of extracted strings 400B omits showing all rankings in order to reduce complexity, but it is understood that every ranked slot between the first slot and the last slot corresponds to a string. The ranked list of extracted strings 400B is further understood to be comprised of the same strings as the list of extracted strings 400A prior to automated analysis, and that these strings have been sorted to different slots based upon their relevance as determined by their associated threat prediction scores.

As can be seen in the ranked list of extracted strings after automated analysis 400B, the ranking of the given strings corresponds to a descending order from high relevant strings, down to mid relevant strings, then to low relevant strings, and then concluding with irrelevant strings. The first three ranked slots correspond to the first, second and third high relevance strings 430, 450, 480. The fifteenth slot corresponds to the mid relevance string 410 which was originally located first in the unranked list of extracted strings 400A. The twenty-third slot corresponds to the low relevance string 440, while the last ranked slot in the ranked list of extracted strings 400B corresponds to the irrelevant string 420 that was previously located in the second slot of the list of extracted strings 400A.

As can be understood, the length of the ranked list of extracted strings 400B can be any length and typically corresponds both to the number of strings extracted from the suspicious binary, but also to the number of ranked slots in the list of extracted strings 400A. However, it is contemplated that certain embodiments may generate a ranked list of extracted strings 400B that is smaller than the unranked list of extracted strings 400A due to the process of eliminating strings that are below a certain relevance threshold or ones that are duplicative. Once generated, the ranked list of extracted strings 400B can then be utilized to generate a threat warning suitable for further malware analysis.

IV. String Analysis Process

Figure 5:
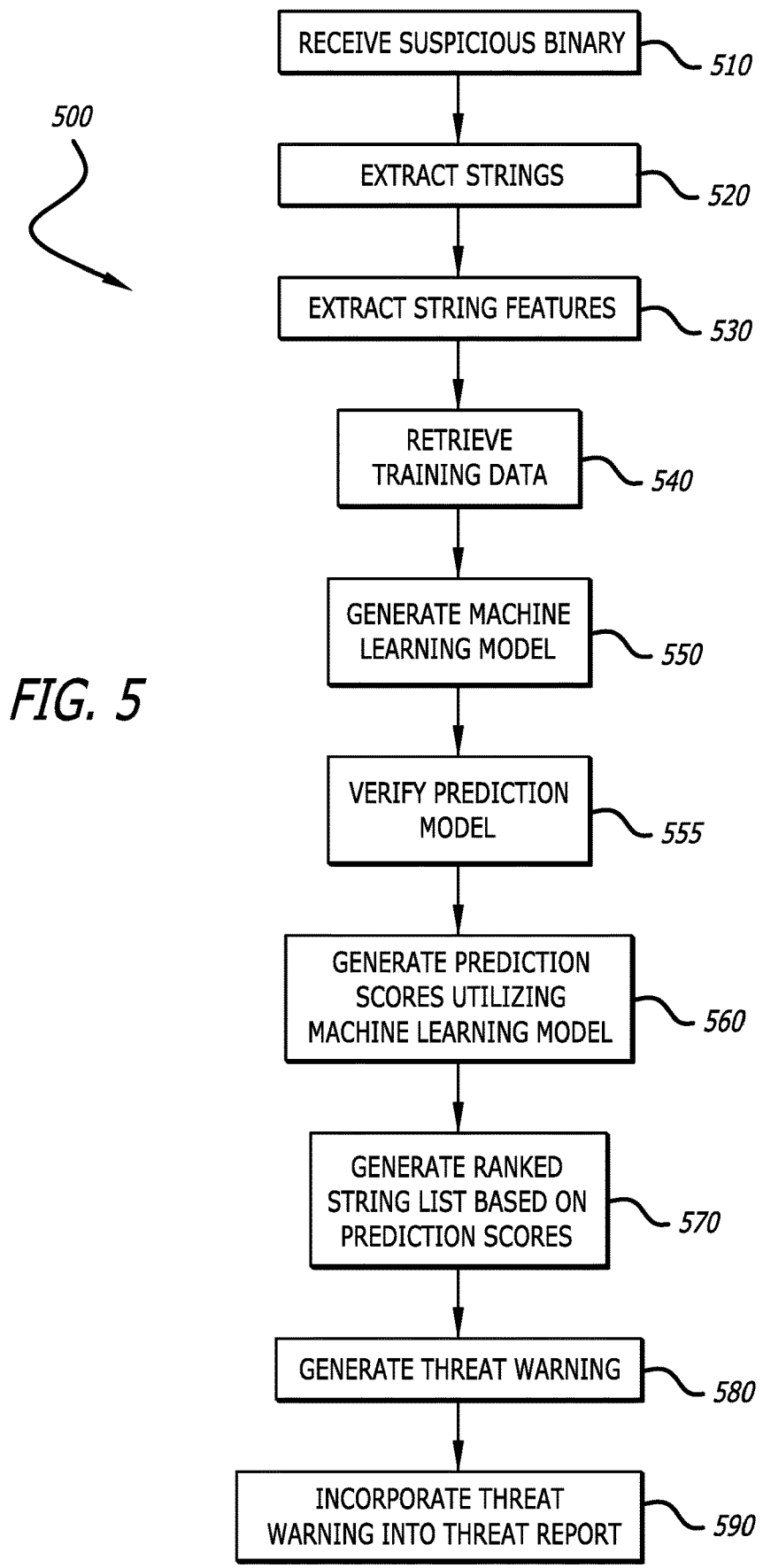
FIG. 5 depicts an exemplary flowchart of an automated process of extracted string set analysis in accordance with an embodiment of the invention.

Referring now to FIG. 5, a flowchart of the automated extracted string analysis process 500 is shown. The process 500 typically begins with the receiving of a suspicious binary (block 510). In many embodiments, this binary can be received from a source device, which could be a hardware-based source, a virtualized source, or any source that is communicatively coupled with the string analysis logic. However, as described above, the source of the received binary can often be from the client device or network security device that is evaluating the binary for malware.

Upon reception of a suspicious binary, the process 500 can utilize a tool to extract the strings from the suspicious binary (block 520). The tool utilized may be, for example, STRINGS.EXE, but may instead be any suitable analytic tool that can generate a list of strings located within a given binary. In a number of embodiments, the generated list of strings is further processed to extract features from the strings (block 530). Features are often processed as a numerical value corresponding to a certain property of the string. As discussed above, features may be related to various aspects of the string including, but not limited to, length, type, frequency, or similarity to previous features. Upon extracting the features from the generated list of strings, the data is ready for processing within a prediction model.

The process 500 often requires that a set of training data be retrieved from a training data source (block 540). In many embodiments, the training data is stored in a memory communicatively coupled to the string analysis logic and can be retrieved directly. In other embodiments, the training data may be available through a remote service and must be requested to be retrieved. Once the training data has been retrieved, a prediction model may be generated based on the training data (block 550). The prediction model can typically be logic that receives new extracted strings and generates a prediction score based on the training data used to generate the prediction model. Often, this can be achieved through the use of a GBDT method. Because the training data comprises scores relating to threat levels associated with previously analyzed extracted strings, the prediction score generated by the prediction model corresponds to a prediction for the perceived level of threat of the new extracted strings.

Once the prediction model is generated, it can then be verified through the use of verification data (block 555). Typically, the verification can be accomplished by running a set of previously verified string data through the prediction model and comparing the results of the prediction model to the results previously determined on the same string data. As a result of the verification process, the prediction model may be adjusted which can be accomplished either manually or via an automated adjustment process based on a set of pre-established thresholds or heuristics. Once verified, the string analysis ranking logic can process each string from within the extracted string set to generate a prediction score that is associated with each analyzed string (block 560). In certain embodiments, the prediction score is a non-negative value that can range from within a lower and upper bound. For example, the threat levels could be assigned a number between zero and seven, with seven being a higher predicted threat than a string associated with a zero prediction score.

Upon completion of the prediction score generation, the process 500 can generate a new string list that ranks the order of the analyzed extracted strings based upon the threat prediction score (block 570). In certain embodiments, the process of generating the ranked list of strings may delete duplicate strings, or add an indicator within the list to each string to denote the number of occurrences of the extracted string within the ranked set. In this way, the ranked list of strings can be displayed in a more efficient manner. In various embodiments, the process of generating the ranked list of extracted strings may limit the number of strings within the ranked set based on factors including, but not limited to, the total number of extracted strings within the original set, or strings that only exceed a certain threat threshold value level. For example, a ranked list of extracted strings may only comprise the first one-hundred entries even if the binary under analysis comprises thousands of strings. The generated ranked list of extracted strings may then be utilized in various ways.

The process 500 can utilize the ranked list of extracted strings to generate an overall threat warning (block 580). As discussed above, threat warnings can have a variety of uses such as generating remedial actions, or providing data for the generation of an overall threat report. Based upon the requirements of the user, the presence of strings that exceed a pre-determined value can create a trigger for a network security system to take immediate remedial action such as, but not limited to, quarantining the suspicious binary within a system, or to halt processing of the binary.

Threat reports may incorporate the threat warning data into the threat report in order to aid a human analyst's further threat analysis of the suspicious binary (block 590). As discussed above, the type of data and report required by the analyst can vary depending on the nature of the analysis sought. For example, the string rankings can be used in an analyst's further investigation and analysis of the cybersecurity threat represented by the binary through analysis of the order of the strings within the ranked strings. The binary analysis results may further be combined with other cybersecurity information and indicators of compromise to aid in determining whether a cyberattack is occurring and/or the remediation appropriate to mitigate the attack and its damage.

The binary utilized in the string ranking analysis may also be subjected to further static and/or dynamic analysis. These types of analysis employ a two-phase malware detection approach to detect malware contained in suspicious binaries or other network traffic monitored in real-time. In a first or "static" phase, a heuristic is applied to a suspicious binary or other object that exhibits characteristics associated with malware. In a second or "dynamic" phase, the suspicious objects are processed within one or more virtual machines and in accordance with a specific version of an application or multiple versions of that application associated with the binary. These methods offer a two-phase, malware detection solution with options for concurrent processing of two or more versions of an application in order to achieve significant reduction of false positives while limiting time for analysis. Static and dynamic analysis techniques that can be utilized in accordance with embodiments of the invention are described in U.S. Pat. No. 9,241,010 issued Jan. 19, 2016 and U.S. Pat. No. 10,284,575, issued May 7, 2019, the disclosures of which are hereby incorporated by reference in their entirety.

In the foregoing description, the invention is described with reference to specific embodiments thereof. It will, however, be evident that various modifications and changes may be made thereto without departing from the broader spirit and scope of the invention as set forth in the appended claims.

What is claimed is:

1. An automated computerized method for analyzing a set of extracted strings relevant for cybersecurity threat detection comprising:

processing a binary with a string-extraction logic, wherein the string extraction logic is configured to locate strings within a received binary and output an extracted string set of the located strings;

processing the extracted string set with a prediction model generated from a set of training data to determine a threat prediction score for each located string within the extracted string set;

ranking the located strings within the extracted string set based upon the determined threat prediction score; and outputting a ranked string list based upon the located strings' ranking, wherein prior to the processing of the extracted string set, the prediction model is generated based on at least the set of training data including a plurality of previously analyzed extracted string sets, each element of the previously analyzed extracted string sets comprises at least one extracted string and a corresponding previously determined threat prediction score.

2. The method of claim 1, wherein the located strings associated with a higher threat prediction score appear in the ranked string list before strings associated with a lower threat prediction score.

3. The method of claim 1, wherein in response to the outputting of the ranked string list, generating a threat warning comprising additional cybersecurity threat data associated with the ranked string list.

4. The method of claim 3, wherein, in response to the threat warning exceeding a first pre-determined threshold, generating a threat report incorporating the ranked string list.

5. The method of claim 4, wherein the threat report only incorporates strings from the ranked string list that exceed a second pre-determined threshold.

6. The method of claim 4, wherein the set of strings incorporated within the threat report does not comprise duplicate strings.

7. The method of claim 3, wherein in response to the threat warning exceeding a pre-determined threshold, a remedial action is conducted.

8. The method of claim 1, wherein the method is practiced at least partially within a cloud-based computing environment.

9. An automated computerized method for analyzing a set of extracted strings relevant for cybersecurity threat detection comprising:

processing a binary with a string extraction logic, wherein the string extraction logic is configured to locate strings within a received binary and output an extracted string set of the located strings;

processing the extracted string set with a prediction model generated from a set of training data to determine a threat prediction score for each located string within the extracted string set;

ranking the located strings within the extracted string set based upon the determined threat prediction score; and outputting a ranked string list based upon the rankings of the located strings, wherein the prediction model utilized to generate the ranked string list is further processed within a quantitative analysis system to generate a first comparative score suitable for comparison with a second comparative score associated with a second prediction model utilized to generate a second ranked string list in order to assess the validity of the prediction model utilized to generate the ranked string list.

10. The method of claim 9, wherein the quantitative analysis system utilizes normalized discounted cumulative gain methods.

11. An automated system for analyzing a set of extracted strings relevant for cybersecurity threat detection comprising:
- a processor; and
- a transitory storage medium communicatively coupled to the processor, the transitory storage medium includes string analysis logic configured to:
  - process a binary with a string extraction logic, wherein the string extraction logic is configured to locate strings within a received binary and output an extracted string set of the located strings;
  - process the extracted string set with a prediction model to determine a threat prediction score for each located string within the extracted string set;
  - rank the located strings within the extracted string set based upon the determined threat prediction score; and
  - output a ranked string list based upon the ranking of the located strings,
  - wherein the prediction model is generated, prior to the processing of the extracted string set based on at least a set of training data comprising a plurality of previously analyzed extracted string sets and
  - wherein each element of the previously analyzed extracted string sets comprises at least one extracted string and a corresponding previously determined threat prediction score.

12. The system of claim 11, wherein the located strings associated with a higher threat prediction score appear in the ranked string list before strings associated with a lower threat prediction score.

13. The system of claim 11, wherein in response to the outputting of the ranked string list, a threat warning is generated comprising additional cybersecurity threat data associated with the ranked string list.

14. The system of claim 13, wherein a threat report incorporates the ranked string list and is generated in response to the threat warning exceeding a first pre-determined threshold.

15. The system of claim 14, wherein the threat report only incorporates strings from the ranked string list that exceed a second pre-determined threshold.

16. The system of claim 14, wherein the ranked string list incorporated within the threat report does not comprise duplicate strings.

17. The system of claim 15, wherein remedial action is taken in response to the threat warning exceeding a third pre-determined threshold.

18. The system of claim 11, wherein the prediction model utilized to generate the ranked string list is further processed within a quantitative analysis system to generate a first comparative score suitable for comparison with a second comparative score associated with a second prediction model utilized to generate a second ranked string list in order to assess the validity of the prediction model utilized to generate the ranked string list.

19. The system of claim 18, wherein the quantitative analysis system utilizes normalized discounted cumulative gain.

20. The system of claim 11, wherein the system is at least partially operated within a cloud-based computing environment.

21. The system of claim 20, wherein the processor is operated within a virtual computing environment.

22. An automated system for analyzing a set of extracted strings relevant for cybersecurity threat detection comprising:
- a processor; and
- a transitory storage medium communicatively coupled to the processor, the transitory storage medium comprises:
  - a string extraction logic to process a binary to locate strings within the binary and output an extracted string set of the located strings;
  - a prediction model logic configured to retrieve a prediction model generated with a set of training data and verified with a set of verification data;
  - a ranking logic configured to rank the located strings within the extracted string set based on a prediction score generated by the prediction model for each located string; and
  - a reporting logic configured to generate a threat warning comprising data generated from the ranked string list wherein the threat warning is formatted for a human analyst to perform further analysis.

23. The automated system of claim 22, wherein the located strings associated with a higher threat prediction score appear in the ranked string list before strings associated with a lower threat prediction score.

24. The automated system of claim 22, wherein the reporting logic to generate the threat warning comprising additional cybersecurity threat data associated with the ranked string list in response to an outputting of the ranked string list.

25. The automated system of claim 22, wherein responsive to the threat warning exceeding a pre-determined threshold, generating the threat report incorporating the ranked string list.

* * * * *